(12) United States Patent
Lee

(10) Patent No.: US 7,742,622 B2
(45) Date of Patent: Jun. 22, 2010

(54) TWO DIMENSION AUTONOMOUS ISOTROPIC DETECTION TECHNIQUE

(75) Inventor: Harry C. Lee, Maitland, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 375 days.

(21) Appl. No.: 11/878,921

(22) Filed: Jul. 27, 2007

(65) Prior Publication Data

US 2007/0269078 A1 Nov. 22, 2007

Related U.S. Application Data

(62) Division of application No. 09/976,040, filed on Oct. 15, 2001, now Pat. No. 7,298,866.

(51) Int. Cl.
*G06K 9/00* (2006.01)

(52) U.S. Cl. ..................................... 382/103; 382/190

(58) Field of Classification Search .................. 382/103, 382/149, 165, 274, 309, 190, 203, 284; 348/152, 348/169; 707/3
See application file for complete search history.

(56) References Cited

U.S. PATENT DOCUMENTS

| | | | |
|---|---|---|---|
| 33,536 A | 10/1861 | Wang | |
| 3,646,264 A | 2/1972 | Waugh | |
| 4,521,909 A | 6/1985 | Wang | |
| 5,068,910 A | 11/1991 | Ogura | |
| 5,361,311 A | 11/1994 | Wilson | |
| 5,434,932 A | 7/1995 | Scott | |
| 5,694,493 A | 12/1997 | Tuli | |
| 5,757,954 A | 5/1998 | Kaun et al. | |
| 5,815,590 A | 9/1998 | Buttner et al. | |
| 5,835,634 A | 11/1998 | Abrams | |
| 5,848,189 A | 12/1998 | Pearson et al. | |
| 6,259,396 B1 | 7/2001 | Pham et al. | |
| 6,337,654 B1 | 1/2002 | Richardson et al. | |
| 6,347,264 B2 | 2/2002 | Nicosia et al. | |
| 6,437,728 B1 | 8/2002 | Richardson et al. | |
| 6,489,920 B1 | 12/2002 | Anders et al. | |
| 6,650,273 B1 | 11/2003 | Obenshain | |
| 6,711,279 B1 | 3/2004 | Hamza et al. | |
| 6,795,590 B1 | 9/2004 | Chen | |
| 6,832,000 B2 | 12/2004 | Herman et al. | |
| 6,841,780 B2 | 1/2005 | Cofer et al. | |
| 7,298,866 B2 * | 11/2007 | Lee | ............................. 382/103 |
| 2002/0004692 A1 | 1/2002 | Nicosia et al. | |
| 2002/0057216 A1 | 5/2002 | Richardson et al. | |
| 2002/0124171 A1 | 9/2002 | Rhoads | |
| 2002/0125435 A1 | 9/2002 | Cofer et al. | |

(Continued)

*Primary Examiner*—Duy M Dang
(74) *Attorney, Agent, or Firm*—Buchanan Ingersoll & Rooney PC

(57) ABSTRACT

The present invention discloses a target detection process that acquires imagery from a target; compares the acquired imagery with image metric data; applies criteria to eliminate false detections and reduce clutter; applies morphological operators on the acquired imagery; probability rank orders the target imagery; divides the imagery into a series of detected target windows; and displays the detected target windows. The imagery undergoes light target detection, dark target detection or both. A morphological operator isolates targets from their background. Two concatenated morphological filter patterns are used to screen imagery data. Spatial discontinuities at the pixel level can be detected. The detected target window images are presented to a user in a mosaic format.

7 Claims, 8 Drawing Sheets

U.S. PATENT DOCUMENTS

2002/0140815 A1  10/2002  Herman et al.
2002/0147544 A1  10/2002  Nicosia et al.
2002/0154833 A1  10/2002  Koch et al.
2002/0176624 A1  11/2002  Kostrzewski et al.
2004/0146184 A1   7/2004  Hamza et al.

* cited by examiner

Filter Pattern 1

| Input Image Pixels | | Erosion Neighborhood | | Output Image Pixels |
|---|---|---|---|---|
| | | | | |

| a | b | c |
|---|---|---|
| d | e | f |
| g | h | i |

⊖

| 0 | 1 | 0 |
|---|---|---|
| 1 | 1 | 1 |
| 0 | 1 | 0 |

=

| a' | b' | c' |
|---|---|---|
| d' | e' | f' |
| g' | h' | i' |

501            502            503 where e' = minimum of { b, d, e, f, h }

Filter Pattern 2

| a | b | c |
|---|---|---|
| d | e | f |
| g | h | i |

⊖

| 1 | 1 | 1 |
|---|---|---|
| 1 | 1 | 1 |
| 1 | 1 | 1 |

=

| a' | b' | c' |
|---|---|---|
| d' | e' | f' |
| g' | h' | i' |

505            506            507

Filter Pattern 1

Input Image Pixels

| a | b | c |
|---|---|---|
| d | e | f |
| g | h | i |

508

Dilation Neighborhood

| 0 | 1 | 0 |
|---|---|---|
| 1 | 1 | 1 |
| 0 | 1 | 0 |

509

=

Output Image Pixels

| a' | b' | c' |
|----|----|----|
| d' | e' | f' |
| g' | h' | i' |

510 where e' = maximum of { b, d, e, f, h }

Filter Pattern 2

Input Image Pixels

| a | b | c |
|---|---|---|
| d | e | f |
| g | h | i |

511

Dilation Neighborhood

| 1 | 1 | 1 |
|---|---|---|
| 1 | 1 | 1 |
| 1 | 1 | 1 |

512

=

Output Image Pixels

| a' | b' | c' |
|----|----|----|
| d' | e' | f' |
| g' | h' | i' |

513 where e' = maximum of { a, b, c, d, e, f, g, h, i }

TWO DIMENSION AUTONOMOUS ISOTROPIC DETECTION TECHNIQUE

CROSS-REFERENCE TO RELATED APPLICATIONS

This application is a divisional application of application Ser. No. 09/976,040, filed on Oct. 15, 2001, now U.S. Pat. No. 7,298,866, the entire content of which is hereby incorporated by reference.

BACKGROUND OF THE INVENTION

1. Technical Field

The present invention relates to a target or object detection process.

2. Background Information

It is often desired to find a target or object against various surrounding backgrounds in very large sampling areas. For example, U.S. Pat. No. 5,848,189, "Method, Apparatus, and System for Verification of Patterns", discloses the use of morphological operators to perform template matching and pattern verification. U.S. Pat. No. 5,068,910, "Image Processing for Reading Dark and Light Characters from Light and Dark Backgrounds Respectively", discloses reading a dark-colored character on a light-colored background. U.S. Pat. No. 3,646,264, "Method of Acquiring a Moving Target" discloses a method for acquiring a moving target using the photo-cathode of a scanning tube and looking for sharply defined contrast edges. The disclosures of these patents are hereby incorporated by reference in their entireties.

Known systems involve searching for a target having predetermined patterns and characteristics, and involve knowing the specific shapes being searched for ahead of time. Searching an area for unknown objects of unspecified shape has been considered computationally intensive, and associated with high false alarm rates that adversely impact a specific search mission.

SUMMARY

The present invention is directed to a method for detecting an object image within image data, the method comprising receiving image data, segmenting the image data into multiple windows, determining a likelihood that each window contains the object and probability rank ordering the multiple windows based on the step of determining, and selecting one of the multiple windows as a window wherein the object image is considered to reside.

The receiving step can comprise collecting and recording the image data as the image data emanates back to a receiver. The step of segmenting can comprise determining a set of image metrics, applying predetermined selection criteria to filter false detections and clutter from the image data, comparing image data, after applying the selection criteria, with the image metrics, and applying morphological operators on the image data.

Exemplary embodiments display at least one of the multiple windows, identify pixels having a lighter contrast compared to other pixels in the imagery, identify pixels having a darker contrast compared to other pixels in the imagery, and identify pixels having both lighter and darker contrast compared to other pixels in the imagery. A morphological operator can be used to isolate targets from their background. Two concatenated morphological filters can be applied to filter the image data.

The method can detect spatial discontinuities at the pixel level. Detected window images and other image data can be displayed to the user in a mosaic format. The detected window images can also be communicated to another system. The image data processed comprises, for example, visual data, thermal data, and synthetic aperture radar (SAR) data.

An alternate target detection process according to the invention comprises acquiring image data, down-sampling the image data n-times, processing the down-sampled image data for detecting at least one of a light target and a dark target, labeling subsets of the image data that may contain target data and rejecting clutter associated with these subsets of the image data, combining results of the image data that has been down-sampled, and forwarding combined results to a decision making authority. The decision making authority can extract windows and rank order them. An image can be down-sampled n-times using a series of low pass filters that can filter in horizontal and\or vertical directions. The process comprises an image that has been down-sampled n-times, where n comprises a large number that can accomplish target detection after accomplishing a larger amount of down-sampling. The filtering process can be performed by a six by six (6×6) convolution filter. The filtering process can also be performed by an N by N convolution filter, where N is a number greater than or equal to one.

BRIEF DESCRIPTION OF THE INVENTION

Objects and advantages of the invention will be understood by reading the following detailed description in conjunction with the following drawings where:

DETAILED DESCRIPTION OF THE PREFERRED EMBODIMENT

Figure 1:
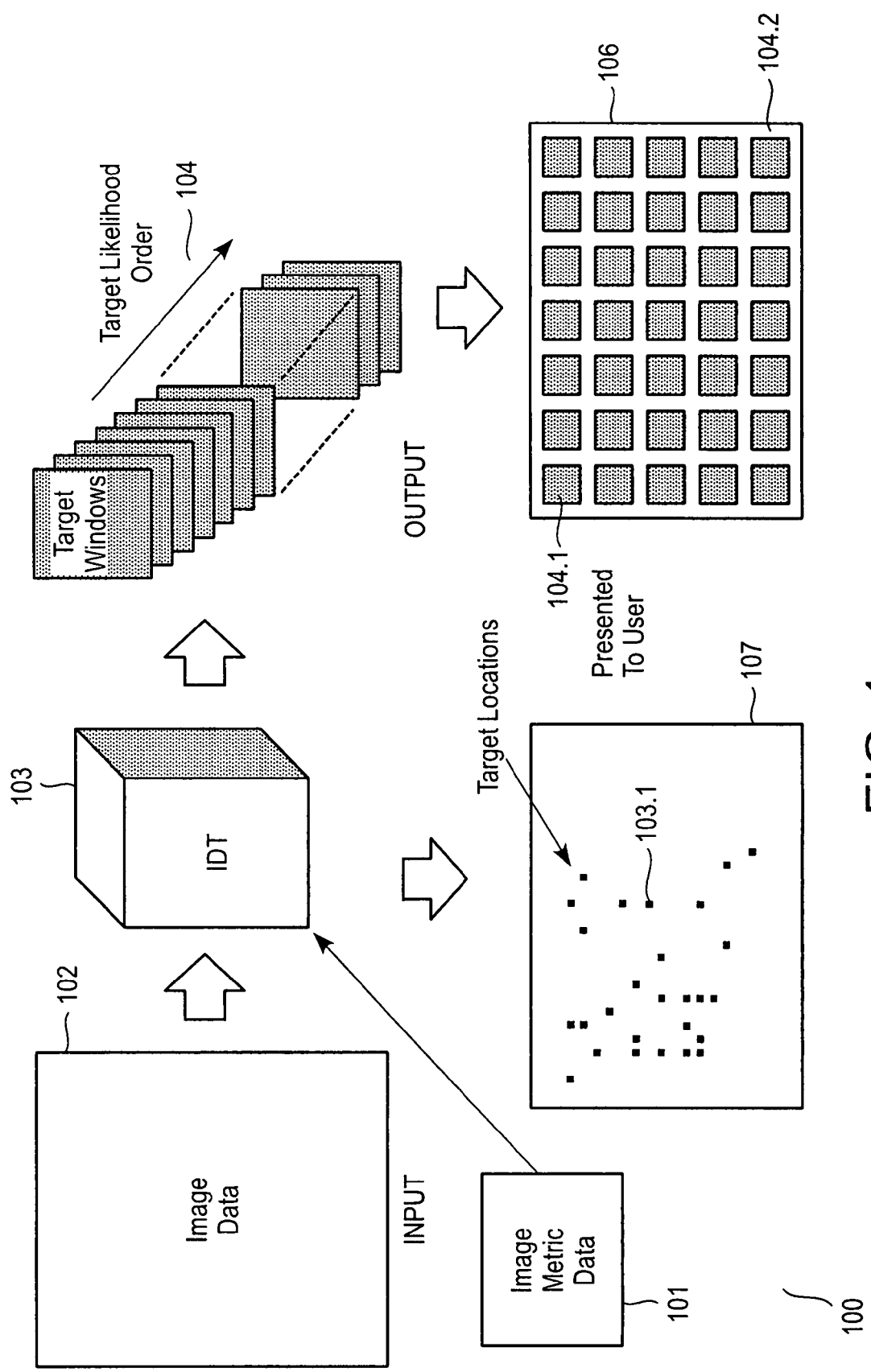
FIG. 1 illustrates an exemplary process according to the present invention.

FIG. 1 illustrates an exemplary method 100 for detecting an object image within image data according to the present invention. This FIG. 1 method comprises receiving image data (e.g. full resolution imagery) in step 102. The image data can be received from any source via any known techniques including, but not limited to, real time data, delayed data from a local source, delayed data from a remote source, or from any desired source. For example, the present invention can accommodate images of approximately 1 Gigabyte in size, however the present invention can be used with images of any size. The system's ability to handle the image size will be, in some cases, a function of the hardware configuration used to implement the image segmentation process, such as processing capability, memory allocations, and so forth. The FIG. 1 method can be implemented on a conventional desktop computer, or any other computing or processing devices available.

The FIG. 1 method also includes a step of segmenting the image data into multiple windows. For an exemplary embodiment, the step of segmenting can be performed by comparing the image data with image metric data. For example, image metric data is established in step 101, and can contain predetermined metric data. Image metric data can include parameters such as the length and width of an image, the ground sample distance of a pixel, the dynamic range of data, sensor information, thermal, visual, Synthetic Aperture Radar (SAR) data, etc. Latitude and longitude coordinates can also be determined by mapping the pixel and line locations of the target using the types of data that are usually included in ocean imagery.

The image metric data established in step 101 of FIG. 1 is fed into an isotropic detection technique (IDT) of a segmenting step 103 and compared with the image data. The image data is segmented by the Isotropic Detection Technique (IDT) in step 103 into multiple windows. The segmenting step 103 can include compressing or expanding the image data before, during, and/or after segmentation of the image data into the multiple windows. Each of the windows includes a subset of the image data received in step 102. In step 104, the image data within each window is processed to determine a likelihood that the window contains the object, and the windows are rank ordered based on the step of determining that is performed by the IDT algorithm and that will be discussed in greater detail below. One exemplary rank ordering method can assign each window a value which corresponds to a probability that the window contains image data relating to the object of interest. The windows can be rank ordered from highest to lowest, lowest to highest, or any other desired window ranking order.

The Isotropic Detection Technique (IDT) used in an exemplary embodiment is an autonomous, two-dimensional image target detection process. The IDT works by acquiring and detecting targets that possess contrast discontinuity changes along their borders or in their internal structures. This technique can examine the effect that the target has on the background surrounding or proximately located next to the target. The IDT algorithm can process large image sets covering upwards of thousands of square miles. These image sets correspond to hundreds of mega-pixels. The complete pixel dynamic range or depth is used in the detection process. In a number of cases, pixel depths up to and including 16 bits have been accommodated. The detection portion of the IDT process can automatically determine both the ship's directional heading and the ship's size.

The segmenting step 103 outputs a series of target windows that in an exemplary embodiment are organized in a target likelihood order in step 104. For example, those windows most likely to contain target information can be displayed first, and those with a lesser likelihood to contain target information are displayed later. Those skilled in the art will recognize that the target information can be displayed in other ways also, such as starting with those target windows least likely to contain information. The target detection region size, plus some standard border outline helps to determine the size of the extracted windows. The border also provides some of the background for context and reference frame. The target windows that are output from the IDT algorithm and appear first in the rank ordered list are those target windows most likely to be a target, while those target windows appearing further down the rank ordered list are most likely to be background clutter.

One of the multiple windows is selected as a window wherein the object image is considered to reside. The window can be selected automatically based on the likelihood determined for the window, or the image likelihood determined for the window, or the image data in the multiple windows can be displayed for the user. For example, the rank ordered target windows of step 104 can be presented on a display to the user as a mosaic of the detected images. User review of the information can be enhanced by mosaicing a number of the windows on a single image 106. A second image 107 of the total scene down-sampled to fit on the display can also be used to provide a synoptic view of the total image, with possible target information being marked as small boxes 103.1. For example, in a maritime application, the possible target information as displayed in the second image 107, can be used to provide potential ship-to-ship relationships.

The mosaic of image 106 can be arranged in any manner the user desires. The mosaic of images selected corresponds to one of the multiple windows where a object image may reside. This mosaic of images can be arranged to make the information easy to understand. One possible arrangement format is to position the target windows from left to right and moving from the top row to the bottom row in probability rank order. The highest probability window step 104.1 would be in the left-most location on the first row at the top of the mosaic. The lowest probability window step 104.2 would be in the right-most location on the last row located at the bottom of the mosaic.

The mosaic format permits an efficient and human factor friendly presentation to the user. However, in addition to presenting the target window information to a human observer, the target window data can also be sent across a communication link to an automated system, computer, or other processing device that is designed to interpret the resulting target window data. Further, a threshold value or floor can be set for the image metric data and only that information that meets this image metric criteria, such as size and target orientation, will be forwarded to a user or automated system.

Figure 2:
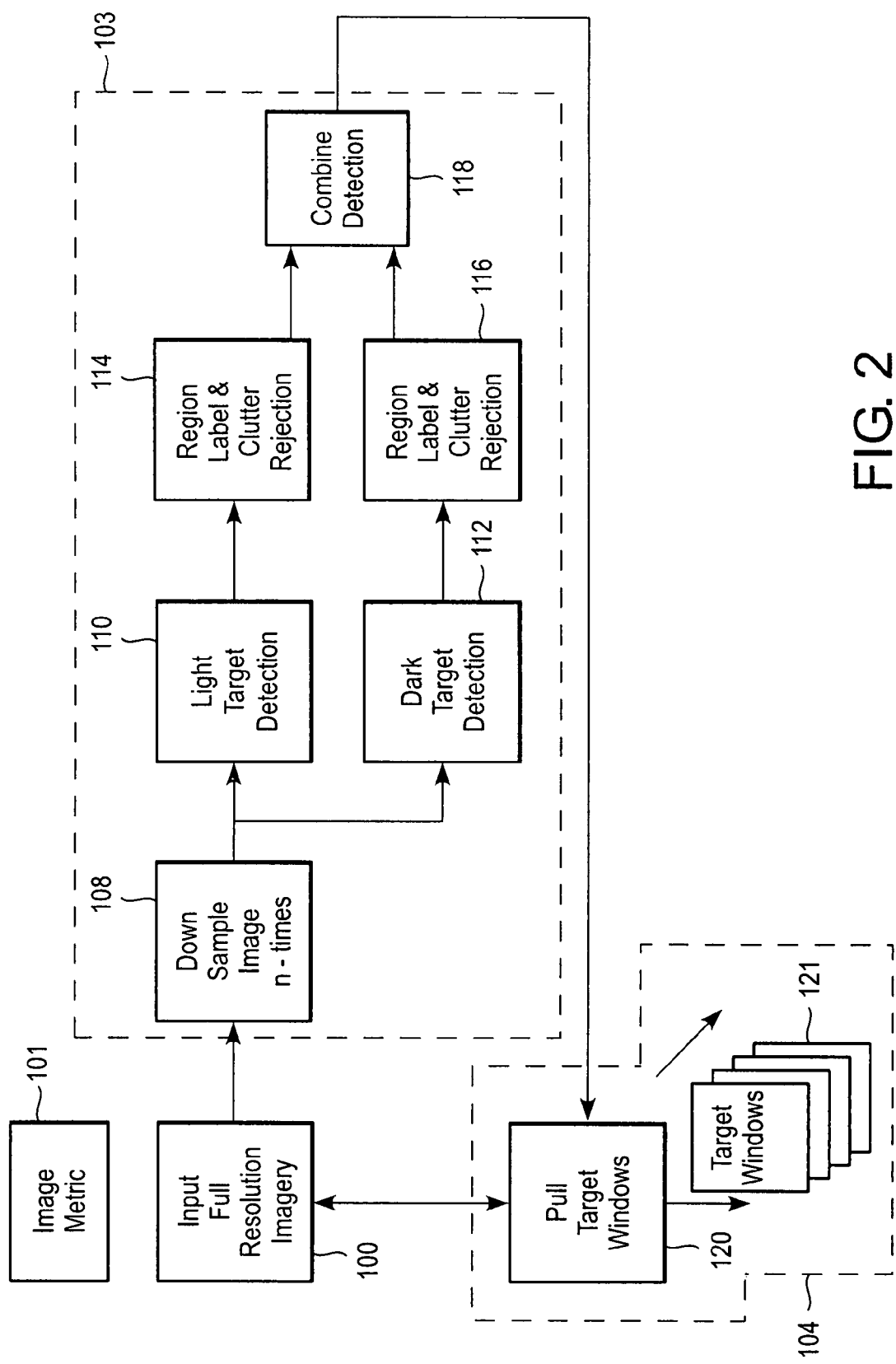
FIG. 2 illustrates an exemplary Isotropic Detection Technique (IDT) algorithm flow which can be used for segmenting the image data of FIG. 1.

FIG. 2 depicts an IDT Top Level Algorithm flow associated with step 103. Both the image data received in step 100 and the image metric data established in step 101 and are input and processed by the IDT during the segmenting step 103.

In step 120, the coordinates of a desired detected target window are obtained and then requests that the corresponding full resolution image relating to the target window be pulled.

The image output step 100 is sent to the IDT algorithm in step 103. Here the image data is down-sampled n-times in step 108 and the output is then processed for Light Target detection step 110, Dark Target detection step 112, or both. One or both of these operational paths can be run in the algorithm depending upon the type of target, the imagery data format accumulated and the background. The Light Target detection data output from step 110 undergoes a region labeling and clutter processing step in step 114. Similarly, the dark target detection data from step 112 then undergoes a region labeling and clutter processing step in step 116. The region that is being labeled is the target region and clutter is the unwanted and extraneous information that is not part of the target region and needs to be removed so as to not obscure the target region.

In 118, the outputs of the Light Target detection step 114 and the Dark Target detection step 116 are combined into a combined detection view and the target windows are then pulled based upon this output criteria. A metric is computed in both the Light and Dark Target Detection routines.

The step 104 of probability rank ordering the multiple windows uses the metric computed in step 103 to order the target windows to be pulled as shown in step 120. This information along with the location and extent is sent forward to step 120 where the full resolution imagery for the window is pulled from the original image data. All the windows are ordered in step 104 by their confidence or IDT metric. For example, high confidence windows are presented first, followed by the lower confidence windows.

Since most ships are typically brighter than an ocean background, especially in Synthetic Aperture Radar (SAR), most of the imagery can be processed with the Light Target detection. However, when a given situation lends itself more appropriately to Dark Target detection, the imagery can be processed by using Dark Target detection. An exemplary scenario where Dark Target detection would be effective is the presence of dark ships in glare or glint imagery in visual or thermal imagery.

Figures 3A, 3B:
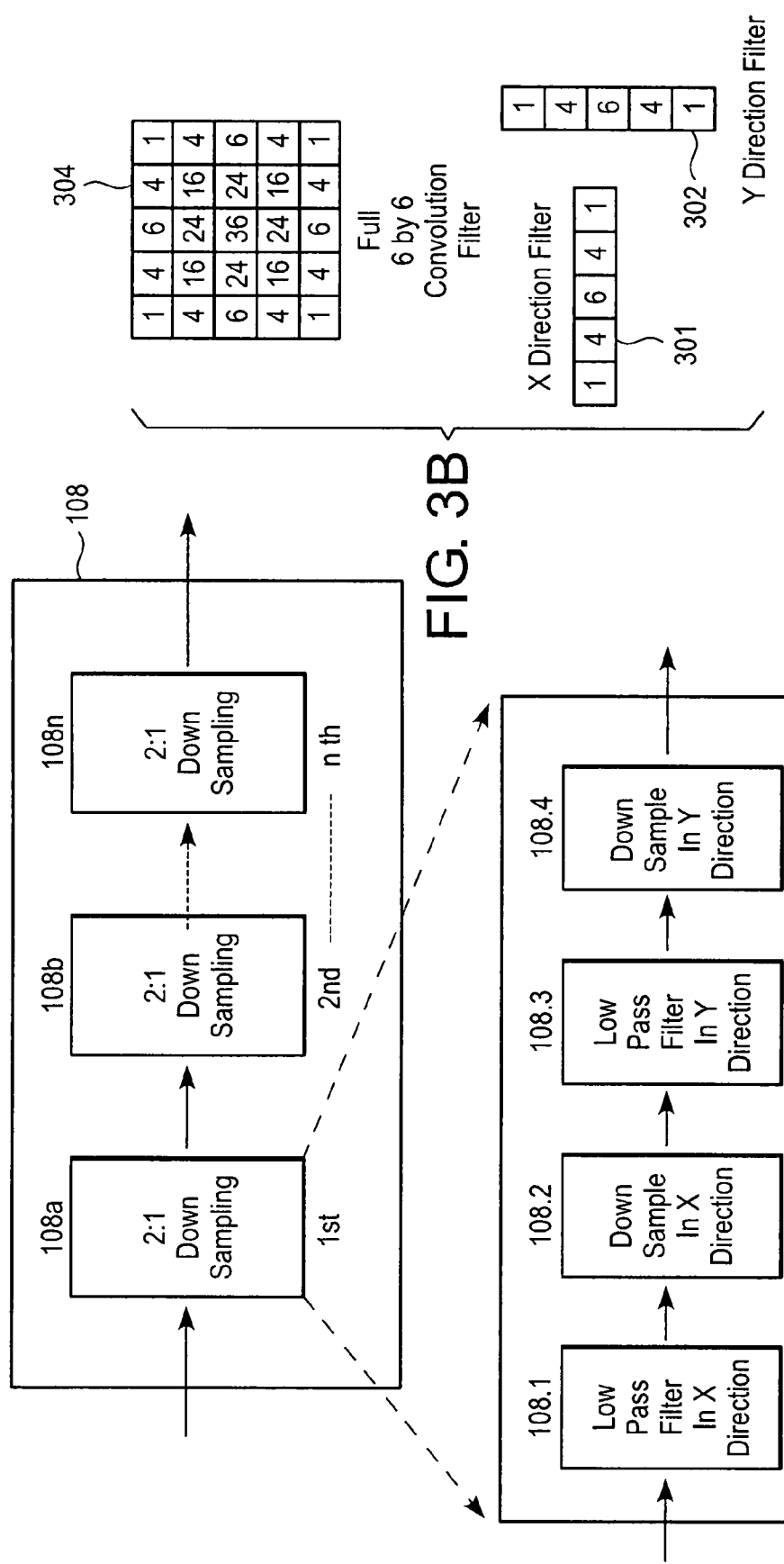
FIG. 3A illustrates an exemplary down-sampling of an image n-times.
FIG. 3B shows exemplary filter kernels used in an exemplary convolution process.

FIG. 3A is an exploded view of the down-sampling process. The image is down-sampled n-times. As shown in 108, the image undergoes a 2:1 down-sampling in 108a, another 2:1 down-sampling in 108b, and so forth, until the n'th 2:1 down-sampling depicted in 108n is reached.

The particular selection of the total number of n down-samples is governed, at least in part, by the minimum target size to be detected. The down sample inter-pixel distance can, for example, be sized so that the minimum object size, such as a ship and all wakes, is approximately 1½ to 2 pixels in the maximum direction after down-sampling, although this sizing can be adjusted to achieve different performance levels.

The down sampling process can serve as a clutter rejecter. However, the level of down-sampling to reject clutter can be balanced against too much down-sampling that results in the loss of small objects. Another benefit of down sampling the original imagery is that down-sampling step can reduce the amount of pixel processing that is used in the algorithm suite. The down-sampling of pixels is not computationally expensive. Therefore, when down-sampling is combined with the rest of the algorithm suite, the resulting total pixel computation load factor is extremely low. As mentioned earlier, IDT simulation runs quickly on a computer, such as a typical desk top computer.

A further detailed view of the 2:1 down-sampling of 108a is shown in FIG. 3.A. Step 108.1 shows that the low pass filtering of the image data is performed in the X direction. Step 108.2 shows the down-sampling performed in the X direction. Step 108.3 shows the low pass filtering of the image data performed in the Y direction and step 108.4 shows the down-sampling in the Y direction.

Each time that a 2:1 down sample is performed, the resulting number of pixels remaining to be processed is reduced by ¼. Therefore, if a total of three down-samples are performed, the resulting image would be 1/256 as large as the original. Consequently, a 256 mega-pixel image would be reduced to a 1 mega-pixel image for processing in the rest of the algorithm.

FIG. 3A shows an image down sampler. The down-sampling can be done as many times as desired to achieve a desired reduced resolution image. The image can be first processed by applying a low pass filter, and followed by decimation in size with a ratio of 2 to 1. One filter construction that can be used to remove both aliasing and clutter is a 6×6 low pass convolution filter. This filter can remove the high frequencies that can cause aliasing when the image is resampled by the down-sampler. A column filter can then be used to operate on every other column element. This will result in a reduction of ¼ the total number of operations.

Although target reduction to one or two pixels can be performed, higher or lower levels of target reduction can be implemented, depending upon the specific application. For example, if a ship having a length of 100 meters is to be detected and the image resolution is about 15 meters per pixel, then two to three 2:1 down-samples, or any other number and/or ratio of down-samples, are performed.

As shown in FIG. 3A, the filter down-sample combination is repeated as desired to achieve the desired resolution so that a target is, for example, one to two pixels in extent. For example, to detect a ship of 100 meters in length, where the image resolution is about 15 meters, 2 to 3, 2:1 down-samples can be performed. Where each a 2:1 down-sample reduces the resulting number of pixels to process by ¼, a total of 3 down-samples will render the resulting image 1/256 as large as the original (e.g., a 256 mega-pixel image would be reduced to 1 mega-pixel image for processing in the rest of the detection algorithm).

FIG. 3B shows filter kernels used in an exemplary convolution process. If a 6×6 kernel is used, it can use 29 adds and 26 shift operations to produce a new pixel. By decomposing the operation into a single row and single column convolution filter, both convolution filters use 11 adds and 8 shift operations. Those skilled in the art will appreciate that other filters and convolution operators can also be used with the present invention. The x direction filter 301 filters in the horizontal direction, and the y direction filter 302 filters in the vertical direction. To achieve 2:1 down-sampling in both the horizontal direction filter 301 and the vertical direction filter 302, a single row convolution operator can be configured to work on every other pixel. The column filter can operate on every other column element of the resulting intermediate image. This will reduce by ¼ the total number of operations.

Convolution operators are well known to those skilled in the art. One filter that can be used in removing both aliasing artifacts and clutter is a 6×6 low pass convolution filter. This filter can remove high frequencies that cause aliasing when the image is resampled by the down-sampler.

Those skilled in the art will appreciate that various convolution operators, filter types and sizes can be used in implementing the IDT operator.

The 6×6 convolution array 304 can, in an exemplary embodiment, be calculated in the following manner. Starting with the value "1" in the left most position of the x direction filter 301 can be multiplied together by each value in the y direction filter 302 moving from top to bottom. These values become the first column of the 6×6 array 304. Moving to the next value "4" in the second position of the x direction filter, each value in the y direction can be multiplied together by each value in the y direction filter 302 moving from top to bottom. These values become the second column of the 6×6 array. This process is repeated for each value in the x direction filter to produce the full 6×6 array depicted in 304.

Figure 4:
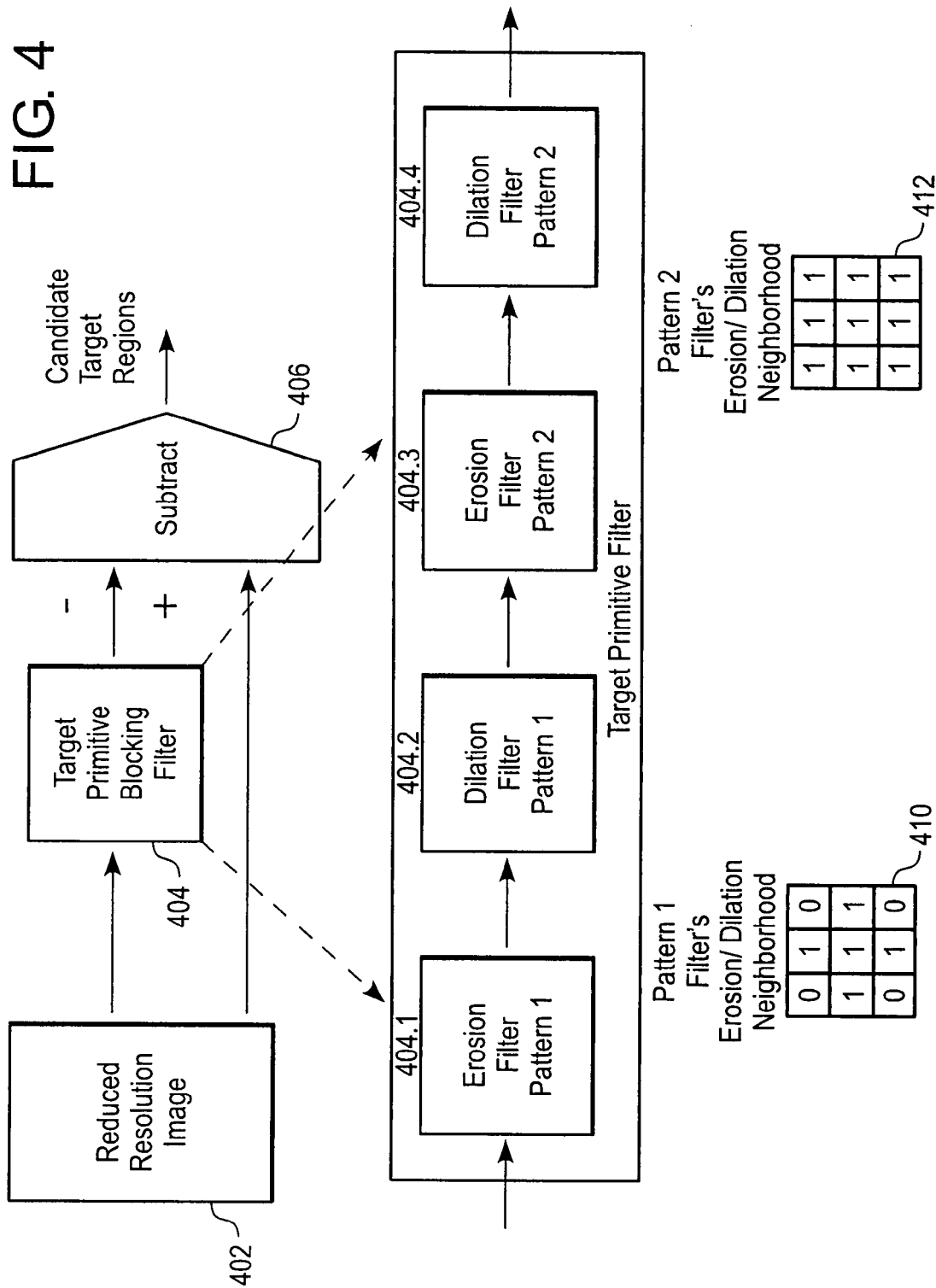
FIG. 4 illustrates an exemplary light target detection process.
Figure 5A:
FIG. 5A illustrates an exemplary erosion filter operation.
Figure 5A:

FIG. 4 illustrates the Light Target detection process. Both Light Target detection Dark Target detection use a similar process. The Target Primitive Blocking Filter, in an exemplary embodiment, is made up of four concatenated 3-by-3 morphological filters as shown in FIG. 4. The image is processed by the Erosion operator 404.1 and then the Dilation operator 404.2, using the "T" pattern of Pattern 1. This step removes the very small target elements. Next, an Erosion operator 404.3 and then a Dilation operator 404.4 using Pattern 2 are applied to the image. Pattern 2 is a slightly bigger pattern and it will remove bigger target elements. The Erosion and Dilation filter pattern 1 and 2 are shown in FIG. 5A.

Image processing routines are used to define the extent of the targets and remove objects that are not considered to be targets of interest, based on size or extent. For example, single point targets are usually rejected as clutter based on the size and the chance that noise spikes will be captured and classified as targets. Next, each remaining region is given a unique label and considered as a candidate target. The extent of each labeled region is determined and a size criteria is applied. If an object's dimensions are too large to be a target, it is eliminated as clutter. In other cases, a threshold minimum sizing criterion can be applied, and candidate targets failing to meet this requirement can be eliminated.

At this stage of the process, objects possessing target like properties have been retained and are tested to determine if they have other ship or target like characteristics. For example, the length to width relationship of the candidate target can be assessed, along with a simple texture measure across the candidate target.

Because of the flexibility to accommodate Light and Dark Target detection and the low false alarm rate, it is possible to run either or both Light and Dark Target detection algorithms, and optionally combine the detection results, to achieve desired system performance and accuracy.

A highest intensity region can be considered to be the most likely target. Light Target detection detects candidate targets or elements that are lighter than their background. In FIG. 4, a reduced resolution image step 402 is sent along two pathways towards a subtractor 406. The reduced resolution image step 402 is the image that results after the full resolution imagery input is down-sampled n-times in step 108 of FIG. 2. A subtractor is a device whose output data is the arithmetic difference of the two (or more) quantities presented as input data to the device. One path heading towards the positive input of the subtractor sends the reduced resolution image through a target primitive filter step 404 into the positive input side of the subtractor. Another path heading towards the negative input of the subtractor sends the reduced resolution image into the negative input side of the subtractor, in this case bypassing the target primitive filter.

In the FIG. 4 example, the target primitive blocking filter is made up of 4 concatenated 3×3 morphological filters. For ease of description, the image referred to in this stage of the process is the reduced resolution image. The target primitive filter 404 contains four morphological filters: two morphological filters for Pattern 1 (404.1 and 404.2) and two morphological filters for Pattern 2 (404.3 and 404.4). The target primitive blocking filter is used to limit the spatial extent of acceptable targets or target elements. It looks for the relative brightness of the pixels that make up these targets or target elements.

The contents of the Pattern 1 filter erosion/dilation neighborhood are shown in step 410 of FIG. 4 and are known as a "T" pattern. The contents of the Pattern 2 filter erosion/dilation neighborhood is shown in 412 of the same figure and is known as a full 3×3 block pattern. These filters will remove the candidate target or candidate target elements regions based on both size and contrast relative to their background. The filtering process suppresses the target regions leaving only background information in the output of the filter. This mostly background image is next subtracted from the reduced resolution image. This process leaves only the candidate target's regions, candidate target elements, or the perturbations that they cause on the background regions. Perturbations can include wake, smoke, or motion Doppler shift. The filtering process will help pickup on these perturbations to help nominate the target regions.

FIG. 5A shows an exemplary filter operation during the erosion process. In Filter Pattern 1, the input image pixels step 501 undergoes an erosion neighborhood step 502 and results in the Output Image Pixels (prime) step 503, where e'=minimum of {b, d, e, f, h}.

In Filter Pattern 2, the input image pixels step 505 are eroded with the neighborhood step 506 and results in the Output Image Pixels (prime) step 507, where e'=maximum of {a, b, c, d, e, f, g, h, i}. Therefore pixel e' of the output image is the maximum of the nine pixel values of the input image pixels.

Figure 6:
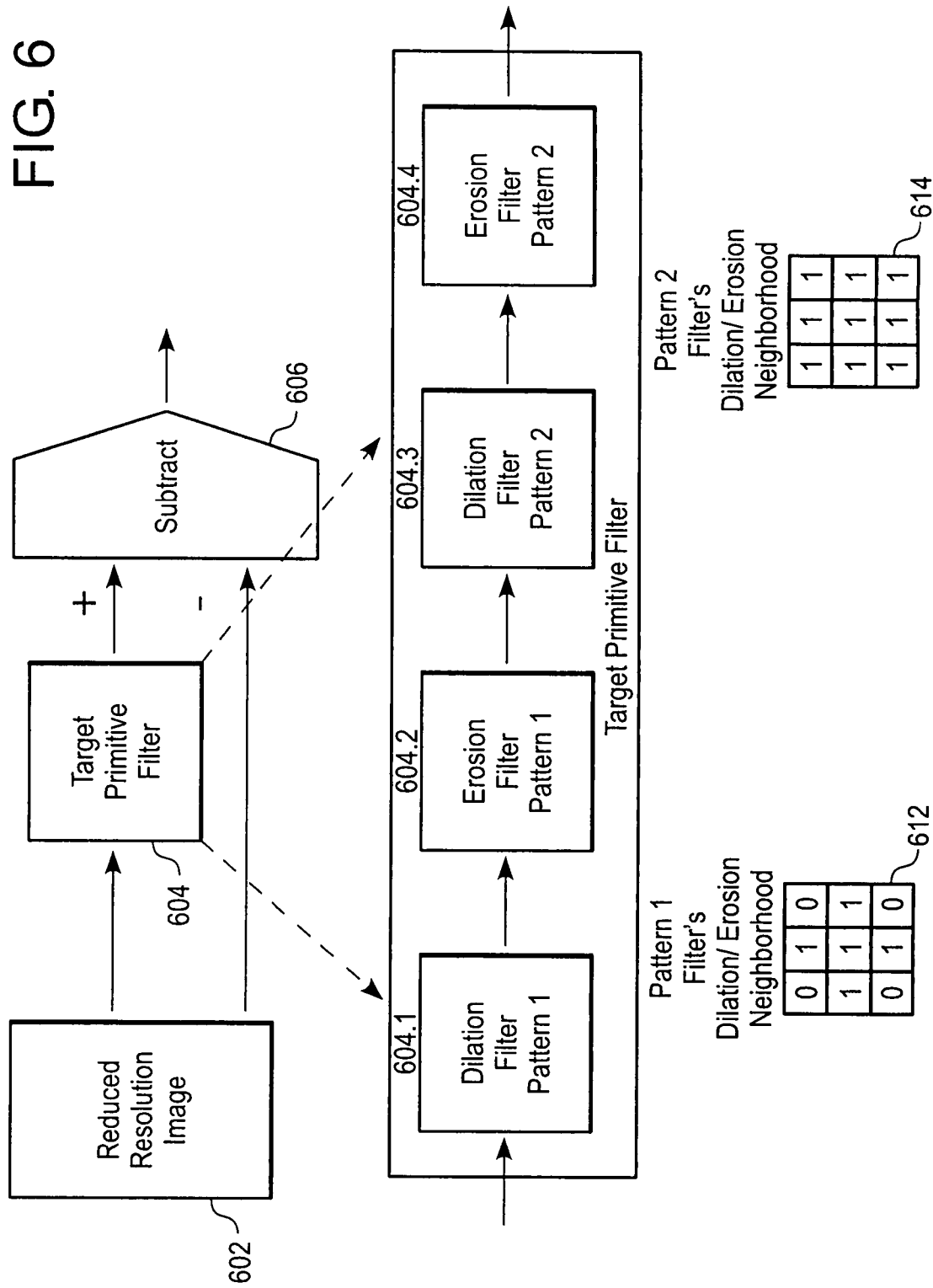
FIG. 6 illustrates an exemplary dark target detection process.

FIG. 6 shows the Dark Target detection process. The Dark Target detection process can be done separately from the Light Target detection process, since it is looking for dark objects against a lighter background. Some examples are visual image ships in a glare or glint setting, thermally cold ships in a relatively warmer water background. Also, dark regions on the water surface such as oil spills as seen in synthetic aperture radar imagery. As with the Light Target detection process, Pattern Filters 1 and 2 operate on the imagery to remove areas of interest from the scene, followed by a subtraction from the unfiltered image to reveal the targets (ships, oil slicks, etc.)

In FIG. 6, a reduced resolution image is sent along two pathways towards a subtractor step 606. One path sends the reduced resolution image data of step 602 towards the negative input of the subtractor step 606. Another path sends the reduced resolution image through a target primitive filter step 604 into the positive side of the subtractor.

In FIG. 6, the target primitive filter step 604 contains four morphological filters: morphological filters for Pattern 1 (604.1 and 604.2) and morphological filters for Pattern 2 (604.3 and 604.4).

The contents of the Pattern 1 filter dilation and erosion neighborhood are shown in step 612 of FIG. 6. The contents of the Pattern 2 filter dilation and erosion neighborhood are shown in step 614 of the same figure.

In the Dark Target detection process, the dilation operation is performed first, followed by the erosion operation. This sequence of operations is followed for both Patterns 1 and 2. In the Dark Target detection case, the subtraction is performed in the reverse order and the input image is subtracted from the operated image.

The output from the Dark Target detection module are all the regions where candidate dark ships or dark targets (e.g. an oil spill) have been detected. As with the Light Target detection, the IDT processes will clean up the resulting image, label and rank order the detection. The rank ordering can, for example, be determined by the minimum intensity produced by the Dark Target detection module of the algorithm, for each of the label regions that pass all the other processes down the algorithm chain.

Figure 5B:
FIG. 5B illustrates an exemplary dilation filter operation.
Figure 5B:

FIG. 5B shows an exemplary filter operation during the dilation process. In Filter Pattern 1, the input image pixels step 508 are operated on in conjunction with the dilation neighborhood step 509 to produce the Output Image Pixels in step 510. This filter operation focuses on the center element "e"', where e'=maximum of {b, d, e, f, h}. In FIG. 5B, non-primed letters correspond to the input image pixels. In step 510 the focus is on input image pixel "e" and the rest of the surrounding values "a, b, c, d, f, g, h and i" are its surrounding "neighbor" pixel values.

In Filter Pattern 2, the input image pixels of step 511 are operated on in conjunction with the dilation neighborhood step 512 to produce the Output Image Pixels in step 513. This filter operation focuses on the center element "e"', where e'=maximum of {a, b, c, d, e, f, g, h, i}.

Figure 7:
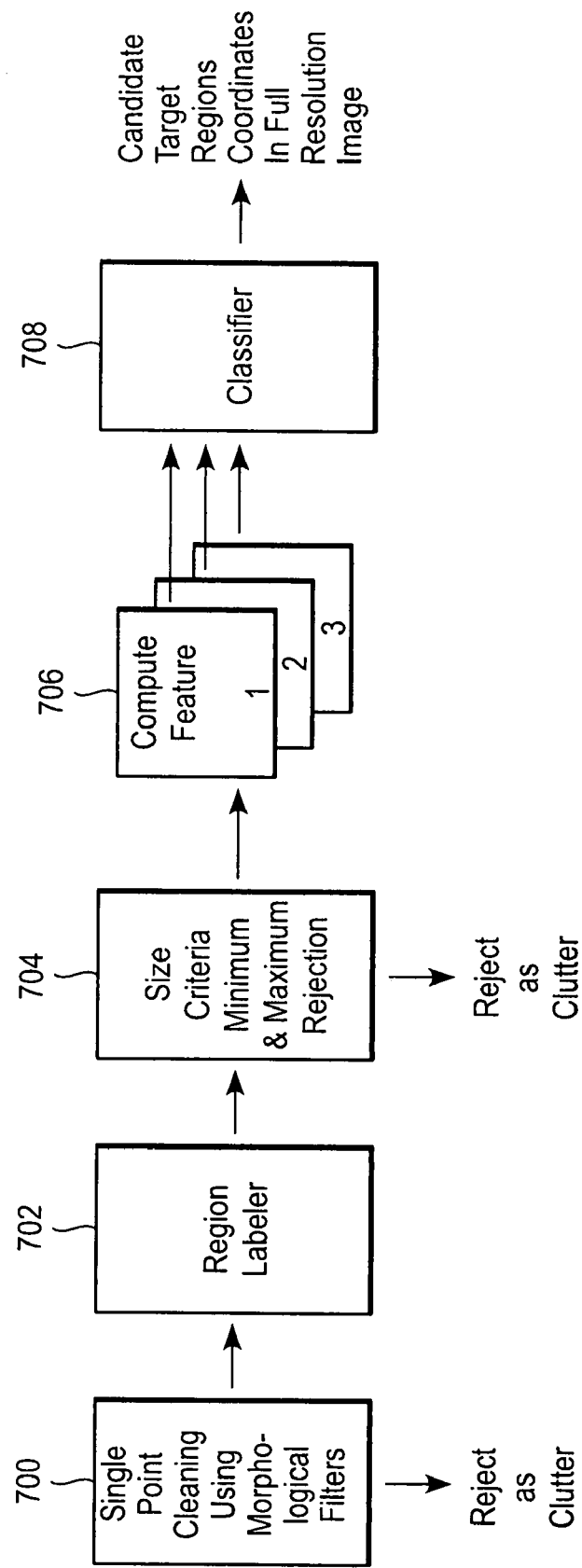
FIG. 7 illustrates an exemplary region labeling and clutter rejection process.

FIG. 7 is an exemplary illustration of the region labeling and clutter rejection process flow. Image processing routines are used to define the extent of the targets and remove those objects that are not to be construed as targets based on their size or extent, or any other desired criteria.

These target regions are optionally sent through a series of single point cleaning and clutter rejection routines of step 700. Step 702 is a region labeler used to label detected candidate regions. Single point target cleaning is accomplished using morphological filters to reject regions as clutter. Single point targets can be rejected as clutter based on the size and chance that noise spikes will be captured and classified as targets. In step 704, minimum and maximum sizing criteria can be used to reject additional regions as clutter through application of sizing criteria with, for example, minimum and/or maximum rejection thresholds. For example, if a potential target is determined to be too large to be an actual target, it is eliminated as clutter. Conversely, if a potential target is determined to be too small to be an actual target, it can also be eliminated as clutter. Each remaining region is given a unique label and considered a candidate target.

The various features of the image data are computed in step 706. Target features such as heading, centroid and extent are computed. Further clutter rejection is accomplished by the classifier of step 708. As an example, the classifier can be a simple quadratic statistical classifier that has been trained to separate targets from clutter. This classification can be based upon any additional constraint requirements the user desires for a given application. For example, the classifier can reject ships having a length greater than, less than, or equal to a specified length. Targets that are moving in an unwanted heading or direction can be screened out. Additionally, target length to width ratios, texture, and the IDT metric determined in the Light or Dark Target detection process can be used, as can any other desired criteria.

The outputs of the process flow shown in FIG. 7 are candidate target regions coordinated in a full resolution image.

Exemplary IDT systems of the present invention can be used in any application including, but not limited to, maritime applications and terrestrial applications. Exemplary embodiments can process a wide range of data types, such as visual, thermal, and Synthetic Aperture Radar (SAR) imagery or any desired data. Exemplary embodiments can detect both man-made and naturally occurring structures and objects, such as ships, icebergs, ice flows, and oil slicks in a naturally occurring background, such as open ocean, with high detection rates that will, for example, 20,000 to 1 data compression ratios (e.g., 90% detection rate, with false alarm rate of less than one per 1,000 square nautical miles). Bandwidth compression obtainable is a function of the number of ships in the viewing area or scene and the false alarm rate. Because excellent data compression ratios can be achieved, it is practical for a person to review and digest the data, or the image data can be disseminated over low bandwidth communication networks.

The present invention has been described with reference to preferred embodiments. However, it will be readily apparent to those skilled in the art that it is possible to embody the invention in specific forms other than that described above, and that this may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed:

1. A target detection process comprising:
   acquiring image data at a processor;
   down-sampling the image data in the processor n-times;
   processing the down-sampled image data for detecting at least one of a light target and a dark target;
   labeling subsets of the image data that may contain target data and rejecting clutter associated with these subsets of the image data;
   combining results of the image data that has been down-sampled; and
   extracting and rank ordering plural windows based on the combined results.

2. The process of claim 1, wherein the extracting and rank ordering step is performed in a decision making authority of the processor.

3. The process of claim 1, comprising:
   an image that is down-sampled n-times using a series of low pass filters that can filter in a horizontal and vertical direction.

4. The process of claim 1, comprising:
   an image that has been down-sampled n-times, where n comprises a large number that can still accomplish target detection after accomplishing a larger amount of down-sampling.

5. The process of claim 1, wherein down sampling the image data comprises:
   filtering the acquired image data through a six by six (6×6) convolution filter.

6. The process of claim 1, wherein down-sampling the image data comprises:
   filtering the acquired image data through an N by N convolution filter, where N is a number greater than or equal to one.

7. The process of claim 1, wherein the processor is performed using an isotropic detector.

\* \* \* \* \*